US008806374B2

(12) United States Patent
Wang

(10) Patent No.: US 8,806,374 B2
(45) Date of Patent: Aug. 12, 2014

(54) ELECTRONIC DEVICE AND FILE MANIPULATION METHOD

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/593,529

(22) Filed: Aug. 24, 2012

(65) Prior Publication Data

US 2013/0167060 A1 Jun. 27, 2013

(30) Foreign Application Priority Data

Dec. 21, 2011 (CN) .......................... 2011 1 0432992

(51) Int. Cl.
*G06F 3/048* (2013.01)

(52) U.S. Cl.
USPC ............................ 715/834; 715/769; 715/841

(58) Field of Classification Search
USPC ......... 715/713, 783, 869, 772, 793, 834, 841, 715/853
See application file for complete search history.

(56) References Cited

U.S. PATENT DOCUMENTS

2012/0036434 A1* 2/2012 Oberstein ..................... 715/834
2012/0042283 A1* 2/2012 Tuesta et al. .................. 715/834
2012/0124520 A1* 5/2012 Samp et al. ................... 715/834
2013/0127911 A1* 5/2013 Brown .......................... 715/834

* cited by examiner

*Primary Examiner* — Weilun Lo
*Assistant Examiner* — Truc Chuong
(74) *Attorney, Agent, or Firm* — Novak Druce Connolly Bove + Quigg LLP

(57) ABSTRACT

An exemplary file manipulation method determines whether the user manipulation on the file or file folder is a moving manipulation. The method then reads a directory structure of each drive from a storage unit when detecting that the user manipulation on the file or file folder is the moving manipulation, determines a maximum folder depth of the directory structure of the one or more drives, and further controls to display a user interface showing the directory structure with the maximum folder depth. Next, the method detects the user manipulation in the user interface, and determines a position where the icon is dragged to is a target position when detecting that the user manipulation is dragging the icon to the position in the ring portion of the sector. The method then moves the manipulated file or file folder to a target drive or file folder corresponding to the target position.

20 Claims, 6 Drawing Sheets

ELECTRONIC DEVICE AND FILE MANIPULATION METHOD

BACKGROUND

1. Technical Field

The present disclosure relates to electronic devices and, more particularly, to an electronic device and a method for copying or moving a file or file folder to another file folder conveniently.

2. Description of Related Art

When copying or moving a file or file folder, the target file folder which the file or file folder is to be moved to needs to be opened first, and then the moved or copied file or file folder is pasted to the opened target file folder, or one can drag the file or file folder to the opened target file folder. However, when the target file folder which the file or file folder is to be moved to is a sub folder of another folder, the normal way for copying or moving the file or file folder is time-consuming and inconvenient. Therefore, it is desirable to provide a new file manipulation system to resolve the above problems.

BRIEF DESCRIPTION OF THE DRAWINGS

The components in the drawings are not necessarily drawn to scale, the emphasis instead being placed upon clearly illustrating the principles of the file manipulation system and file manipulation method. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
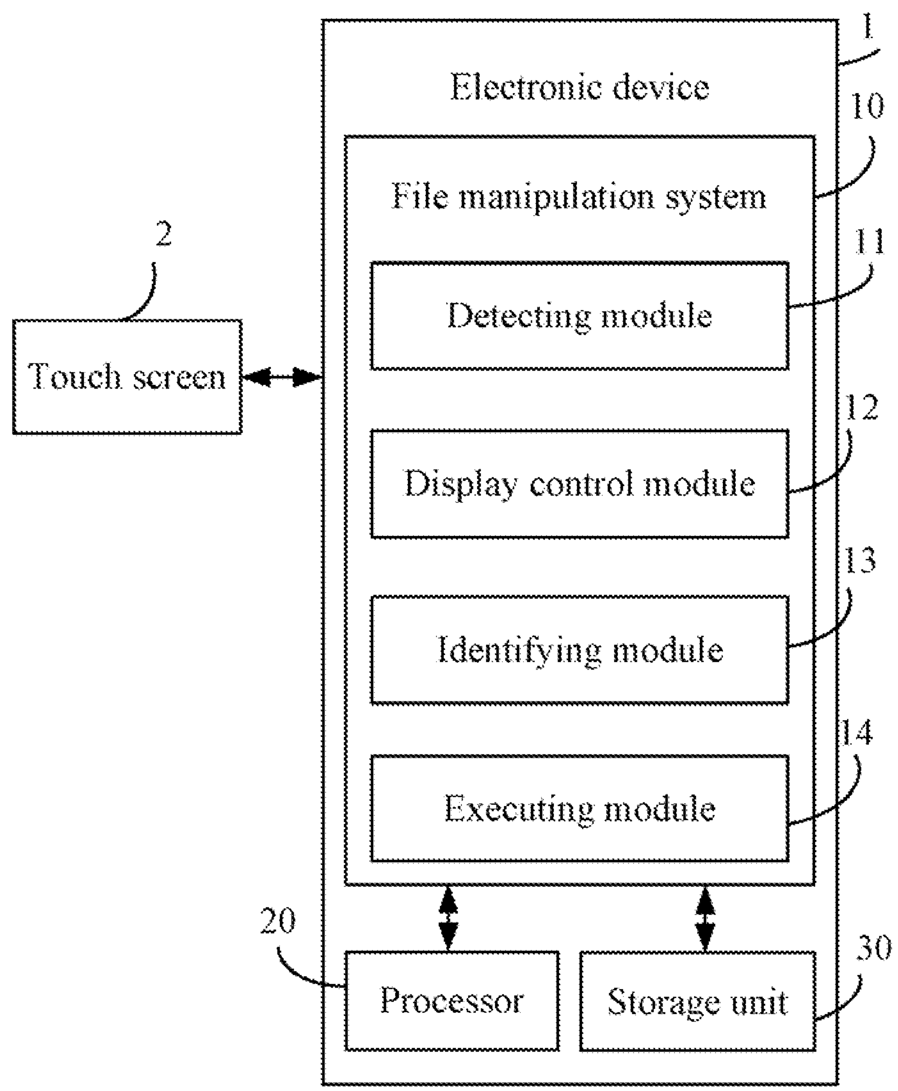
FIG. 1 is a block diagram of a file manipulation system in accordance with an exemplary embodiment.

FIG. 1 shows a block diagram of an electronic device 1 in accordance with an exemplary embodiment. The electronic device 1 is connected to a touch screen 2. The electronic device 1 can move a file or file folder to a target drive or file folder in response to user manipulations on the touch screen 2. In the embodiment, the electronic device 1 includes a file manipulation system 10, a processor 20, and a storage unit 30. The storage unit 30 includes a number of drives named drive C, drive D, drive E, and drive F. Each of the drives stores a number of file folders. The file folders can be named file folder 1, file folder 2, file folder 3, file folder 4, . . . , file folder 13, . . . , and file folder n.

The file manipulation system 10 includes a detecting module 11, a display control module 12, an identifying module 13, and an executing module 14. One or more programs of the above function modules may be stored in the storage unit 30 and executed by the processor 20. In general, the word "module," as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The detecting module 11 detects the user manipulation on a file or file folder, and determines whether the user manipulation on the file or file folder is a moving manipulation. In the embodiment, the moving manipulation is determined by dragging a file or file folder along a preset path or where the duration of a press manipulation on a file or file folder is greater than a preset time.

When the detecting module 11 detects that the user manipulation on the file or file folder is a moving manipulation, the display control module 12 reads a directory structure of each drive from the storage unit 30, determines a maximum folder depth of the directory structure of the drives, and further controls the touch screen 2 to display a user interface 100 (see in FIG. 2) showing the directory structure with the maximum folder depth.

Figure 2:
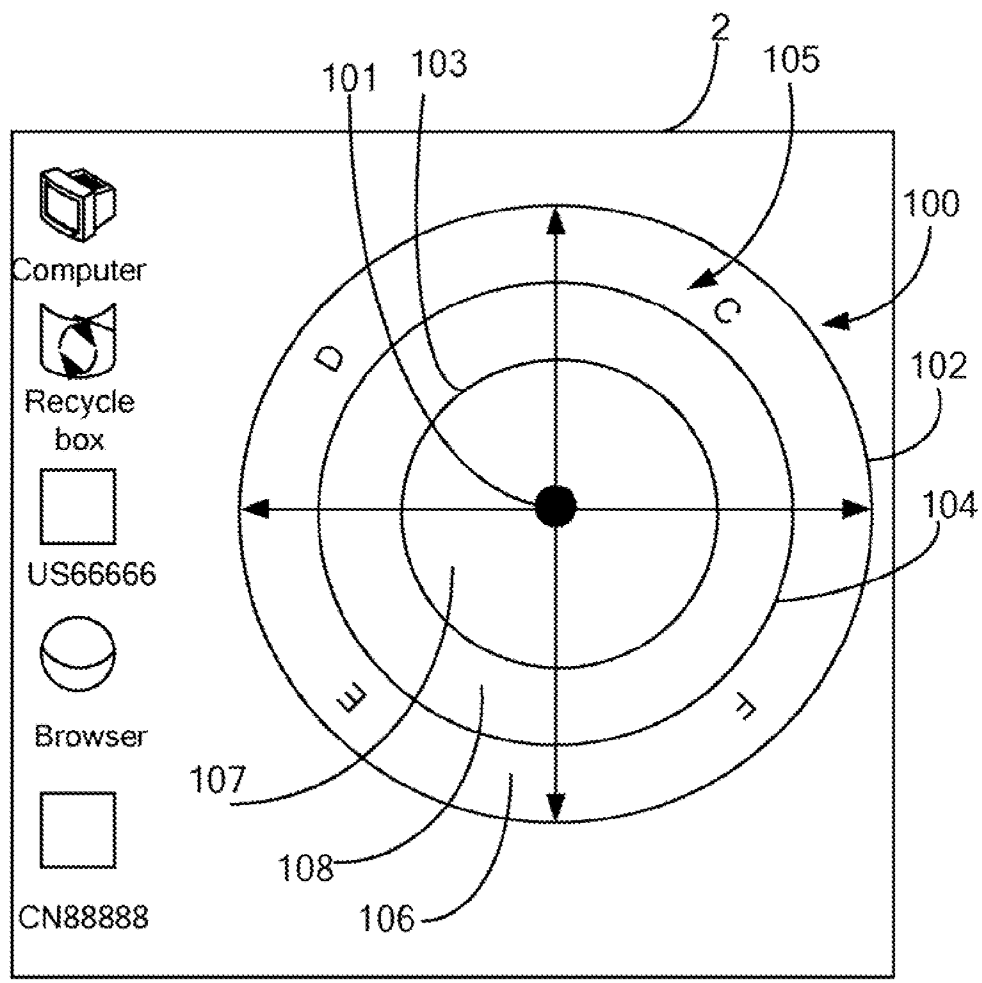
FIG. 2 is a view illustrating a user interface in accordance with an exemplary embodiment.

Referring to FIG. 2, the user interface 100 includes a number of concentric circles which form a number of circular rings. The number of the circular rings corresponds to the maximum folder depth of the directory structure. For example, in FIG. 2, the maximum folder depth of the directory structure is 3 and therefore the number of the circular rings is three. The three circular rings are a first circular ring 102, a second circular ring 103, and a third circular ring 104. The first circular ring 102 is the outer ring of the concentric circles. The second circular ring 103 is the innermost ring of the concentric circles. The third circular ring 104 is the area between the first circular ring 102 and the second circular ring 103. The distributions of the first circular ring 102, the second circular ring 103, and the third circular ring 104 are not limited to this embodiment, and they can be distributed in another order of the concentric circles. The concentric circles are divided into a number of sectors 105 according to the number of the drives. In the embodiment, the size of each circular sector 105 of the concentric circles is equal. In another embodiment, the size of each sector 105 of the concentric circles is determined by the number of the file folders included in each drive. Each of the circular sectors 105 represents one of the drives and is divided into a number of ring portions by the circular rings, and each ring portion of the sectors 105 is used to represent one layer of the directory structure of a corresponding one of the drives. For example, there are four circular sectors 105 representing four drives, such as C drive, D drive, E drive, and F drive. A first ring portion 106 of each circular sector 105 represents the root layer of the directory structure of the corresponding drive, a second ring portion 107 of each circular sector 105 represents a second layer of the directory structure of the corresponding drive, and a third ring portion 108 of each circular sector 105 represents a third layer of the directory structure of the corresponding drive. An icon 101 in the center of the concentric circles represents the file or file folder to be manipulated, e.g., to be copied or moved. The control display module 12 further controls the touch screen 2 to display the root layer of the directory structure of each drive in the first ring portion 106 of the corresponding sector 105, such as drive C, drive D, drive E, or drive F.

The identifying module 13 detects a user manipulation in the user interface 100, and determines a position where the icon 101 is dragged to is a target position when detecting that the user manipulation is dragging the icon 101 to the position in one of the ring portion of one sectors 105. The executing module 14 moves the file or file folder to a target drive or file folder corresponding to the target position and stores the file path or the new directory structure.

In the embodiment, the identifying module 13 further determines whether a file folder is displayed in the position where the file or file folder is dragged to. When a file folder is displayed in the position, the identifying module 13 determines that the file folder is the target position. When no file folder is displayed in the position, the identifying module 13 establishes a new file folder in the position of the user interface 100, namely, the identifying module 13 establishes a new file folder in a corresponding layer of the directory structure which corresponds to the position in the user interface 100 to which the icon 101 is dragged. The identifying module 13 further determines that the new file folder is the target position.

In the embodiment, the identifying module 13 further detects the duration of time of the dragged icon 101 stayed in one position in the ring portion of one circular sector 105, and whether the period of time is greater than a first preset time (such as 2 seconds). When the duration of time of the dragged icon 101 in the position is greater than the first preset time, the identifying module 13 determines that the position in the ring portion of the sector 105 is the target position.

In the embodiment, the identifying module 13 further generates a prompt for the user to select a copying or a moving command. When the copying command is selected, the executing module 14 copies the file or file folder to the target drive or file folder corresponding to the target position. When the moving command is selected, the executing module 14 moves the file or file folder to the target drive or file folder corresponding to the target position.

In the embodiment, the identifying module 13 further determines the duration of time that the user has not manipulated in the user interface 100, and further stops displaying the user interface 100 when such duration is greater than a second preset time (such as 30 seconds).

Figure 3:
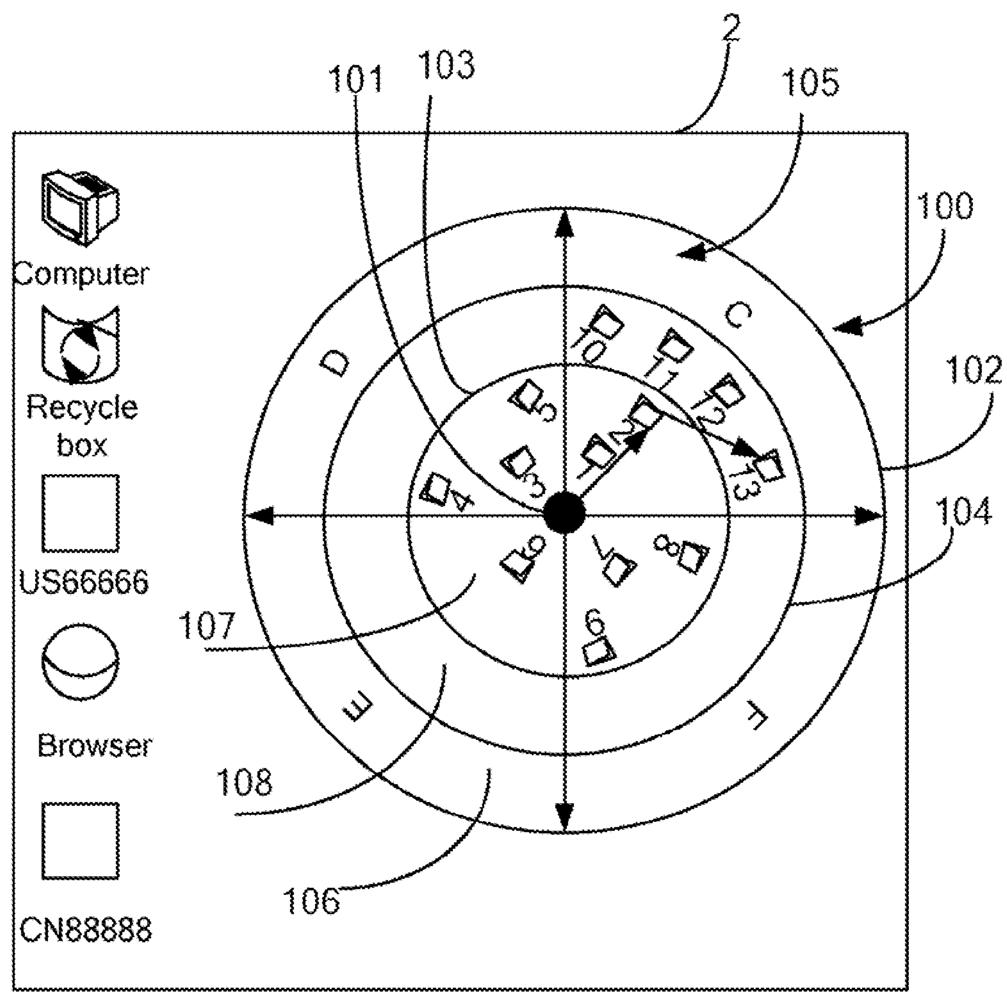
FIG. 3 is a view illustrating a user manipulation in the user interface of FIG. 2 in a first embodiment.

Referring further to FIG. 3, in a first embodiment, when the identifying module 13 detects that the user manipulation in the user interface 100 is touching the icon 101, the identifying module 13 outputs a first signal. The display control module 12 controls the touch screen 2 to display folders (e.g., folder 1 to folder 9) of the second layer of the directory structure of each drive in the second ring portion 107 of the corresponding sector 105 in response to the first signal. When the identifying module 13 detects that the user manipulation is dragging the icon 101 to one folder (e.g., folder 2) of the second layer of the directory structure of one drive located in the second ring portion 107 of one sector 105, the identifying module 13 outputs a second signal. The display control module 12 controls the touch screen 2 to display the subfolders (e.g., folder 10 to folder 13) of the selected folder (e.g., folder 2) of the second layer of the directory structure of the drive in the third ring portion 108 of the corresponding sector 105 according to the second signal.

Figure 4:
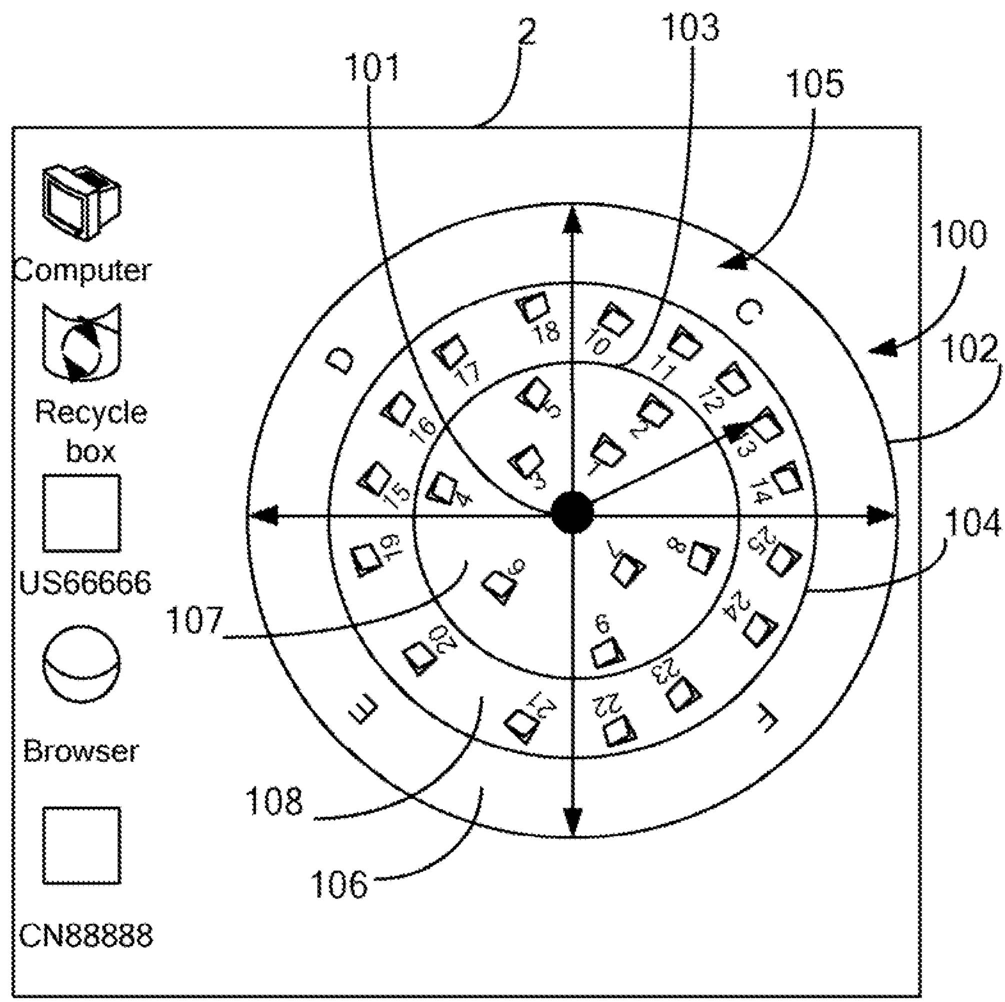
FIG. 4 is a view illustrating a user manipulation in the user interface of FIG. 2 in a second embodiment.

Referring to FIG. 4, in a second embodiment, when the identifying module 13 detects that the user manipulation in the user interface 100 is touching the icon 101, the identifying module 13 outputs a third signal. The display control module 12 controls the touch screen 2 to display the folders (e.g., folder 1 to folder 9) of the second layer of the directory structure of each drive in the second ring portion 107 of the corresponding sector 105 and display the folders (e.g., folder 10 to folder 25) of the third layer of the directory structure of each drive in the third ring portion 108 of the corresponding sector 105 in response to the third signal.

Figure 5:
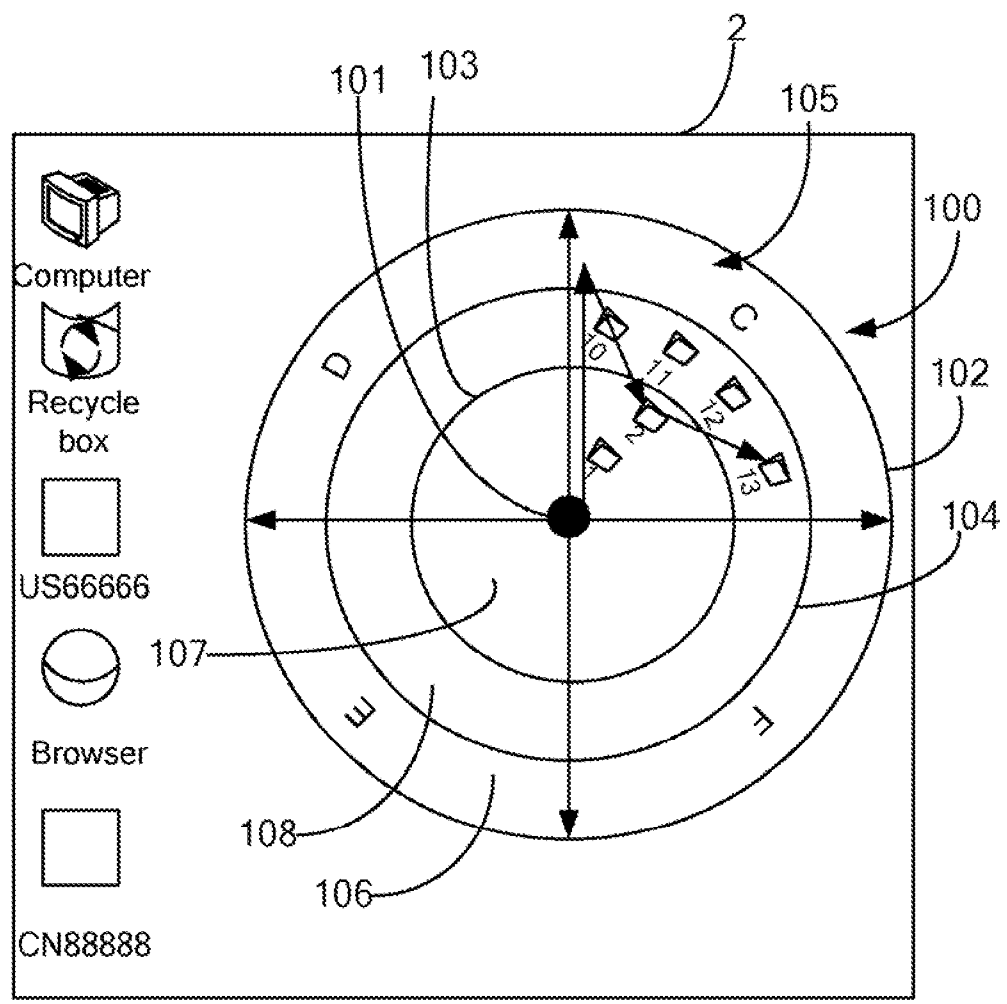
FIG. 5 is a view illustrating a user manipulation in the user interface of FIG. 2 in a third embodiment.

Referring to FIG. 5, in a third embodiment, when the identifying module 13 detects that the user manipulation in the user interface 100 is dragging the icon 101 to the first ring portion 106 of one sector 105 (e.g., drive C), the identifying module 13 outputs a fourth signal. The display control module 12 controls the touch screen 2 to display the folders (e.g., folder 1 to folder 2) of the second layer of the directory structure of the drive corresponding to the first ring portion 106 of the one sector 105 in the second ring portion 107 of the corresponding sector 105 in response to the fourth signal. When the identifying module 13 detects that the user manipulation in the user interface 100 is dragging the icon 101 to one folder (e.g., folder 2) of the second layer of the directory structure of the drive located in the second ring portion 107 of one sector 105, the identifying module 13 outputs a fifth signal. The display control module 12 controls the touch screen 2 to display the subfolders (e.g., folder 10 to folder 13) of the one folder (e.g., folder 2) of the second layer of the directory structure of the drive in the third ring portion 108 of the corresponding sector 105 in response to the fifth signal.

Figure 6:
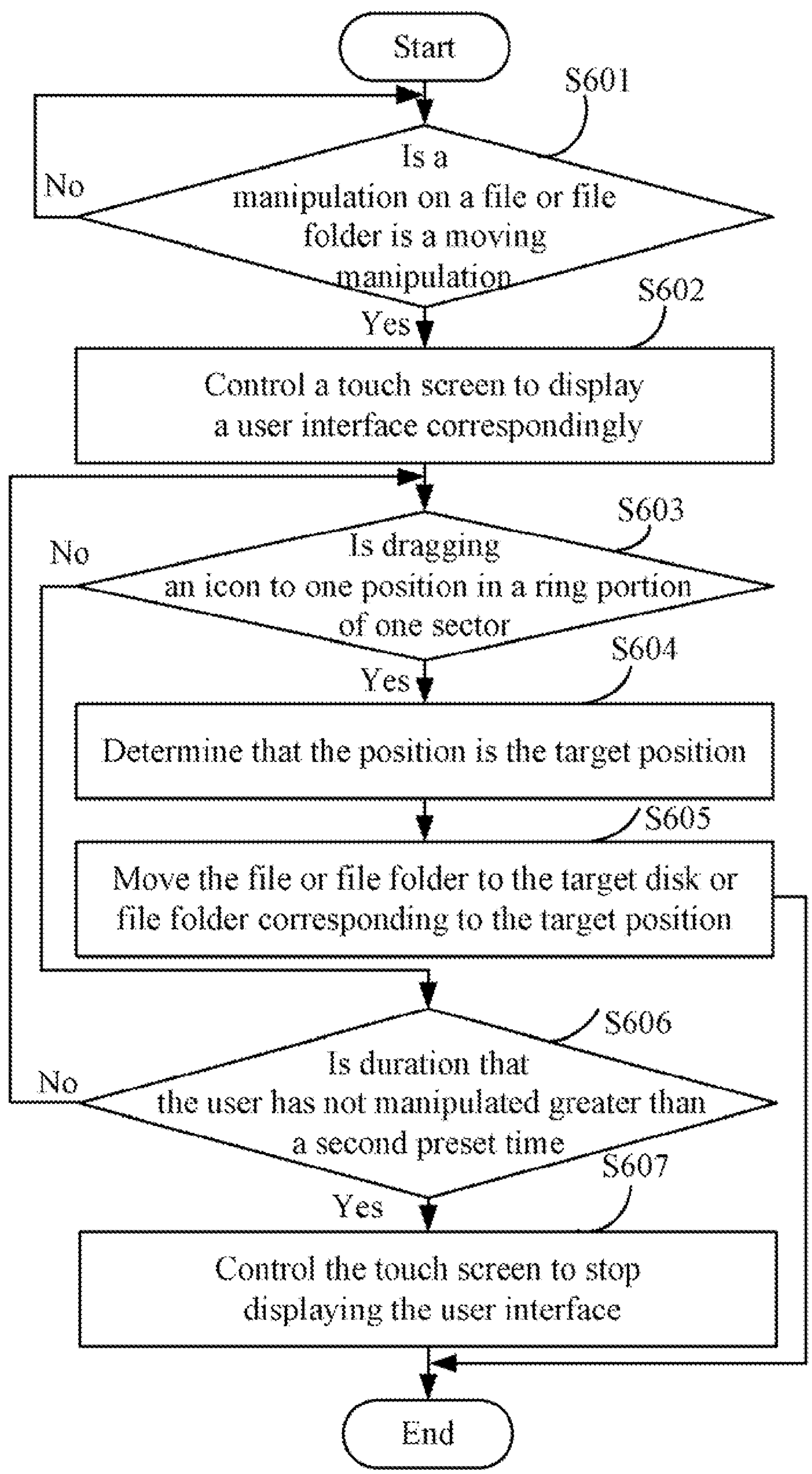
FIG. 6 is a flowchart of a file manipulation method in accordance with an exemplary embodiment.

FIG. 6 shows a flowchart of a file manipulation file in accordance with an exemplary embodiment using the following steps.

In step S601, the detecting module 11 detects whether the user manipulation on a file or file folder is a moving manipulation. When the user manipulation on the file or file folder is a moving manipulation, the procedure goes to step S602. When the user manipulation on the file or file folder is not a moving manipulation, the procedure goes to step S601.

In step S602, the display control module 12 reads a directory structure of each drive from the storage unit 30, determines a maximum folder depth of the directory structure of the drives, and further controls the touch screen 2 to display a user interface 100 showing the directory structure with the maximum folder depth. The user interface 100 includes a number of concentric circles which form a number of circular rings. The number of the circular rings corresponds to the maximum folder depth of the directory structure. In the embodiment, the number of the circular rings is three and the circular rings are a first circular ring 102, a second circular ring 103, and a third circular ring 104. The first circular ring 102 is the outer circular ring of the concentric circles. The second circular ring 103 is the inner circular ring of the concentric circles. The third circular ring 104 is the area between the first circular ring 102 and the second circular ring 103. The distributions of the first circular ring 102, the second circular ring 103, and the third circular ring 104 are not limited to this embodiment, and they can be distributed in another position of the concentric circles. The concentric circles are divided into a number of sectors 105 according to the number of the drives. In the embodiment, the size of each sector 105 of the concentric circles is equal. In another embodiment, the size of each circular sector 105 of the concentric circles determined by the number of the file folders included in each drive. Each of the circular sectors 105 represents one drive and is divided into a number of ring portion by the circular rings, and each of the ring portions of the sectors 105 is used to represent a layer of the directory structure of a corresponding one of the drives. A first ring portion 106 of each circular sector 105 represents the root layer of the directory structure of the corresponding drive, a second ring portion 107 of each sector 105 represents a second layer of the directory structure of the corresponding drive, and a third ring portion 108 of each sector 105 represents a third layer of the directory structure of the corresponding drive. An icon 101 in the center of the concentric circles represents the file or file folder to be manipulated. The control display module 12 further controls the touch screen 2 to display the root layer of the directory structure of each drive in the first ring portion 106 of the corresponding sector 105, such as drive C, drive D, drive E, or drive F.

In step S603, the identifying module 13 detects the user manipulation in the user interface 100, and determines whether the user manipulation in the user interface 100 is dragging the icon 101 to one position in the ring portion of one sector 105. When the user manipulation in the user interface 100 is dragging the icon 101 to one position in the ring portion of one sector 105, the procedure goes to step S604. When the user manipulation in the user interface 100 is not dragging the icon 101 to one position in the ring portion of one sector 105, the procedure goes to step S606.

In step S604, the identifying module 13 determines that the position where the icon 101 is dragged to is the target position.

In step S605, the executing module 14 moves the file or file folder to the target drive or file folder corresponding to the target position and stores the file path or the new directory structure.

In step S606, the identifying module 13 detects whether the duration of time that the user has not manipulated in the user interface 100 is greater than a second preset time. When the duration is greater than the second preset time, the procedure goes to step S607. When the duration is not greater than the second preset time, the procedure goes to step S603.

In step S607, the display control module 12 controls the touch screen 2 to stop displaying the user interface 100.

In the embodiment, before the step S604 is executed, the identifying module 13 further generates a prompt for the user to select a copying command or a moving command. When the copying command is selected, the executing module 14 copies the file or file folder to the target drive or file folder corresponding to the target position. When the moving command is selected, the executing module 14 moves the file or file folder to the target drive or file folder corresponding to the target position.

In the embodiment, in step S603, the identifying module 13 further detects the duration of time of the dragged icon 101 stayed in one position in the ring portion of one sector 105, and whether the duration is greater than a first preset time. When the duration is greater than the first preset time, the identifying module 13 determines that the position in the ring portion of the one sector 105 is the target position.

In the embodiment, in step S603, the identifying module 13 further determines whether a file folder is displayed in the position where the file or file folder is dragged to. When a file folder is displayed in the position, the identifying module 13 determines that the file folder is the target position. When no file or file folder is displayed in the position, the identifying module 13 establishes a new file folder in a corresponding layer of the directory structure which corresponds to the position where the icon 101 is dragged to in the user interface 100, and further determines that the new file folder is the target position.

After the step S602 is executed, in a first embodiment, when the identifying module 13 detects that the user manipulation in the user interface 100 is touching the icon 101, the identifying module 13 outputs a first signal. The display control module 12 controls the touch screen 2 to display folders of the second layer of the directory structure of each drive in the second ring portion 107 of the corresponding sector 105 in response to the first signal. When the identifying module 13 detects that the user manipulation is dragging the icon 101 to one folder of the second layer of the directory structure of one drive located in the second ring portion 107 of one sector 105, the identifying module 13 outputs a second signal. The display control module 12 controls the touch screen 2 to display the subfolders of the one folder of the second layer of the directory structure of one drive in the third ring portion 108 of the corresponding sector 105 in response to the second signal.

In a second embodiment, when the identifying module 13 detects that the user manipulation in the user interface 100 is touching the icon 101, the identifying module 13 outputs a third signal. The display control module 12 controls the touch screen 2 to display the folders of the second layer of the directory structure of each drive in the second ring portion 107 of the corresponding sector 105 and display the folders of the third layer of the directory structure of each drive in the third ring portion 108 of the corresponding sector 105 in response to the third signal.

In a third embodiment, when the identifying module 13 detects that the user manipulation in the user interface 100 is dragging the icon 101 to the first ring portion 106 of one sector 105, the identifying module 13 outputs a fourth signal. The display control module 12 controls the touch screen 2 to display the folders of the second layer of the directory structure of the drive corresponding to the first ring portion 106 of the one circular sector 105 in the second ring portion 107 of the corresponding sector 105 in response to the fourth signal. When the identifying module 13 detects that the user manipulation in the user interface 100 is dragging the icon 101 to one folder of the second layer of the directory structure of the drive located in the second ring portion 107 of one sector 105, the identifying module 13 outputs a fifth signal. The display control module 12 controls the touch screen 2 to display the subfolders of the one folder of the second layer of the directory structure of the drive in the third ring portion 108 of the corresponding sector 105 in response to the fifth signal.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
- a storage unit comprising one or more drives, each of one or more drives storing a plurality of file folders which forms a directory structure;
- a processor; and
- a plurality of programs stored in the storage unit, executable by the processor, the plurality of programs comprising:
  - a detecting module operable to detect a user manipulation on a file or file folder, and determine whether the user manipulation on the file or file folder is a moving manipulation;
  - a display control module operable to read a directory structure of each drive from the storage unit when the detecting module detects that the user manipulation on the file or file folder is the moving manipulation, determine a maximum folder depth of the directory structure of the one or more drives, and further control to display a user interface showing the directory structure with the maximum folder depth, wherein the user interface comprises a plurality of concentric circles which form a plurality of circular rings, the number of the circular rings corresponds to the maximum folder depth of the directory structure, the concentric circles are divided into one or more sectors, corresponding to the number of the one or more drives, each of the sectors represents one of the one or more drives and is divided into a plurality of ring portions by the plurality of circular rings, and each ring portion of the sectors represents a layer of the directory structure of a corresponding one of the one or more drives, a first ring portion of each circular sector represents the root layer of the directory structure of the corresponding drive, an icon in the center of the concentric circles represents the manipulated file or file folder;

an identifying module operable to detect the user manipulation in the user interface, and determine a position where the icon is dragged to is a target position when detecting that the user manipulation is dragging the icon to the position in one of the ring portion of the one or more sectors; and an executing module operable to move the manipulated file or file folder to a target drive or file folder corresponding to the target position.

2. The electronic device as described in claim 1, wherein a second ring portion of each sector represents a second layer of the directory structure of the corresponding drive, and a third ring portion of each sector represents the third layer of the directory structure of a corresponding disk.

3. The electronic device as described in claim 2, wherein when the identifying module detects that the user manipulation in the user interface is touching the icon, the identifying module outputs a first signal, the display control module controls the touch screen to display folders of the second layer of the directory structure of each drive in the second ring portion of the corresponding sector in response to the first signal.

4. The electronic device as described in claim 3, wherein when the identifying module detects that the user manipulation is dragging the icon to one folder of the second layer of the directory structure of one drive located in the second ring portion of one sector, the identifying module outputs a second signal, the display control module controls the touch screen to display the subfolders of the one folder of the second layer of the directory structure of one drive in the third ring portion of the corresponding sector in response to the second signal.

5. The electronic device as described in claim 2, wherein when the identifying module detects that the user manipulation in the user interface is touching the icon, the identifying module outputs a third signal, the display control module controls the touch screen to display the folders of the second layer of the directory structure of each drive in a second ring portion of the corresponding sector and display the folders of the third layer of the directory structure of each drive in a third ring portion of the corresponding sector in response to the third signal.

6. The electronic device as described in claim 2, wherein the identifying module further detects whether the duration of time of the dragged icon stayed in one position in the ring portion of one sector is greater than a first preset time, and determines that the position in the ring portion of the sector is the target position when the staying duration of the dragged icon in one position in the ring portion of one sector is greater than the first preset time.

7. The electronic device as described in claim 2, wherein when the identifying module detects that the user manipulation in the user interface is dragging the icon to first ring portion of one sector, the identifying module outputs a fourth signal, the display control module controls to display the folders of the second layer of the directory structure of the drive corresponding to the first ring portion of the one sector in the second ring portion of the corresponding sector in response to the fourth signal.

8. The electronic device as described in claim 7, wherein when the identifying module detects that the user manipulation in the user interface is dragging the icon to one folder of the second layer of the directory structure of the drive located in the second ring portion of one sector, the identifying module outputs a fifth signal, the display control module controls to display the subfolders of the one folder of the second layer of the directory structure of the drive in the third ring portion of the corresponding sector in response to the fifth signal.

9. The electronic device as described in claim 2, wherein the identifying module further generates a prompt for the user to select a copying command and a moving command; when the copying command is selected, the executing module copies the manipulated file or file folder to the target drive or file folder corresponding to the target position; when the moving command is selected, the executing module moves the manipulated file or file folder to the target drive or file folder corresponding to the target position.

10. The electronic device as described in claim 2, wherein the identifying module further determines the duration of time that the user has not manipulated in the user interface, and further stops displaying the user interface when the duration of time that the user has not manipulated in the user interface is greater than a second preset time.

11. A file manipulation method comprising:

detecting a user manipulation on a file or file folder, and determining whether the user manipulation on the file or file folder is a moving manipulation;

reading a directory structure of each drive from a storage unit when detecting that the user manipulation on the file or file folder is the moving manipulation, determining a maximum folder depth of the directory structure of the one or more drives, and further controlling to display a user interface showing the directory structure with the maximum folder depth, wherein the user interface comprises a plurality of concentric circles form a plurality of circular rings, the number of the circular rings corresponds to the maximum folder depth of the directory structure, the concentric circles are divided into one or more sectors corresponding to the number of the one or more drives in the storage unit, each of the sectors represents one of the one or more drives and is divided into a plurality of ring portions by the plurality of circular rings, and each ring portion of the sectors represents a layer of the directory structure of a corresponding one of the one or more drive, a first ring portion of each circular sector represents the root layer of the directory structure of the corresponding drive, an icon in the center of the concentric circles represents the manipulated file or file folder;

detecting the user manipulation in the user interface, and determining a position where the icon is dragged to is a target position when detecting that the user manipulation is dragging the icon to the position in one of the ring portion of the one or more sectors; and moving the manipulated file or file folder to a target drive or file folder corresponding to the target position.

12. The file manipulation method as described in claim 11, wherein a second ring portion of each sector represents a second layer of the directory structure of the corresponding drive, and a third ring portion of each sector represents the third layer of the directory structure of a corresponding drive.

13. The file manipulation method as described in claim 12, wherein the method further comprises:

outputting a first signal when detecting that the user manipulation in the user interface is touching the icon; and controlling the touch screen to display folders of the second layer of the directory structure of each drive in the second ring portion of the corresponding sector in response to the first signal.

14. The file manipulation method as described in claim 13, wherein the method further comprises:

outputting a second signal when detecting that the user manipulation is dragging the icon to one folder of the second layer of the directory structure of one drive located in the second ring portion of one sector; and controlling the touch screen to display the subfolders of the one folder of the second layer of the directory structure of one drive in the third ring portion of the corresponding circular sector in response to the second signal.

15. The file manipulation method as described in claim 12, wherein the method further comprises:

outputting a third signal when detecting that the user manipulation in the user interface is touching the icon; and controlling the touch screen to display the folders of the second layer of the directory structure of each drive in a second ring portion of the corresponding sector and display the folders of the third layer of the directory structure of each drive in a third ring portion of the corresponding sector in response to the third signal.

16. The file manipulation method as described in claim 12, wherein the method further comprises:

detecting whether the duration of time of the dragged icon stayed in one position in the ring portion of one sector is greater than a first preset time; and determining that the position in the ring portion of the sector is the target position when the staying duration of the dragged icon in one position in the ring portion of one sector is greater than the first preset time.

17. The file manipulation method as described in claim 12, wherein the method further comprises:

outputting a fourth signal when detecting that the user manipulation in the user interface is dragging the icon to first ring portion of one sector; and controlling to display the folders of the second layer of the directory structure of the drive corresponding to the first ring portion of the one sector in the second ring portion of the corresponding sector in response to the fourth signal.

18. The file manipulation method as described in claim 17, wherein the method further comprises:

outputting a fifth signal when detecting that the user manipulation in the user interface is dragging the icon to one folder of the second layer of the directory structure of the drive located in the second ring portion of one sector; and controlling the touch screen to display the subfolders of the one folder of the second layer of the directory structure of the drive in the third ring portion of the corresponding sector in response to the fifth signal.

19. The file manipulation method as described in claim 12, wherein the method further comprises:

determining the duration of time that the user has not manipulated in the user interface, and further stops displaying the user interface when the duration of time that the user has not manipulated in the user interface is greater than a second preset time.

20. A non-transitory storage medium storing a set of instructions, the set of instructions capable of being executed by a processor of an electronic device, causing the electronic device to perform a file manipulation method, the method comprising:

detecting a user manipulation on a file or file folder, and determining whether the user manipulation on the file or file folder is a moving manipulation;

reading a directory structure of each drive from a storage unit when detecting that the user manipulation on the file or file folder is the moving manipulation, determining a maximum folder depth of the directory structure of the one or more drives, and further controlling to display a user interface showing the directory structure with the maximum folder depth, wherein the user interface comprises a plurality of concentric circles form a plurality of circular rings, the number of the circular rings corresponds to the maximum folder depth of the directory structure, the concentric circles are divided into one or more sectors corresponding to the number of the one or more drives in the storage unit, each of the sectors represents one of the one or more drives and is divided into a plurality of ring portions by the plurality of circular rings, and each ring portion of the sectors represents a layer of the directory structure of a corresponding one of the one or more drive, a first ring portion of each sector represents the root layer of the directory structure of the corresponding drive, an icon in the center of the concentric circles represents the manipulated file or file folder;

detecting the user manipulation in the user interface, and determining a position where the icon is dragged to is a target position when detecting that the user manipulation is dragging the icon to the position in one of the ring portion of the one or more sectors; and moving the manipulated file or file folder to a target drive or file folder corresponding to the target position.

* * * * *